United States Patent [19]

Naiser

[11] Patent Number: 5,226,486
[45] Date of Patent: Jul. 13, 1993

[54] LAWN EDGER APPARATUS

[76] Inventor: Johnnie J. Naiser, 214 Ridgewood, Victoria, Tex. 77901

[21] Appl. No.: 859,949

[22] Filed: Mar. 30, 1992

[51] Int. Cl.⁵ .................. A01D 34/10; A01D 34/47
[52] U.S. Cl. .................................. 172/15; 172/17; 56/256; 56/12.1
[58] Field of Search .................... 172/13–18; 56/12.1, 12.7, 16.8, 256; 248/503, 505, 231.6

[56] References Cited

U.S. PATENT DOCUMENTS

| | | | |
|---|---|---|---|
| 2,538,230 | 1/1951 | Boggs | 172/16 |
| 2,718,838 | 9/1955 | Schumacher | 172/16 |
| 2,791,082 | 5/1957 | McDonough et al. | 56/256 |
| 2,978,041 | 4/1961 | Kramer | 172/15 |
| 3,405,514 | 10/1968 | Pulrang | 56/16.8 |
| 3,561,199 | 2/1971 | Lay | 56/17.1 |
| 3,587,749 | 6/1971 | Sauer | 172/17 |
| 3,743,028 | 7/1973 | McCloud | 56/17.2 |
| 4,565,256 | 1/1986 | Valdez | 248/503 |
| 4,712,363 | 12/1987 | Claborn | 172/17 |
| 4,914,899 | 4/1990 | Carmine | 172/17 |
| 5,029,435 | 7/1991 | Buchanan | 172/17 |

FOREIGN PATENT DOCUMENTS 230134  8/1960  Australia ................. 56/256

Primary Examiner—Dennis L. Taylor
Assistant Examiner—Spencer Warnick
Attorney, Agent, or Firm—Leon Gilden

[57] ABSTRACT

A lawn edger is arranged for mounting a lawn edging tool thereon, wherein the apparatus includes a support plate movably mounted by underlying aligned wheel members. A clamp mounted to a top surface of the support plate is positioned rearwardly of a medial forward edge of the support plate, with the medial forward edge having a downwardly projecting abutment guide plate mounted orthogonally and downwardly therefrom.

2 Claims, 4 Drawing Sheets

LAWN EDGER APPARATUS

BACKGROUND OF THE INVENTION

1. Field of the Invention

The field of invention relates to lawn edger apparatus, and more particularly pertains to a new and improved lawn edger apparatus having a support plate arranged to secure and guide a lawn edging tool.

2. Description of the Prior Art

Various lawn edging apparatus is available in the prior art to provide for the proper positioning and alignment of a lawn edging structure. Such apparatus is exemplified in the U.S. Pat. No. 4,914,899 to Carmine wherein a support plate structure is arranged to receive a lawn tool.

U.S. Pat. No. 3,743,028 to McCloud sets forth an elongate framework having cutter wheels mounted to the framework to permit right and left edging of a lawn structure.

U.S. Pat. No. 3,561,199 to Lay sets forth a structure for mounting a lawn edger tool.

As such, it may be appreciated that there continues to be a need for a new and improved lawn edger apparatus as set forth by the instant invention which addresses both the problems of ease of use as well as effectiveness in construction in properly orienting a lawn edger tool relative to a lawn for edging thereof and in this respect, the present invention substantially fulfills this need.

SUMMARY OF THE INVENTION

In view of the foregoing disadvantages inherent in the known types of lawn edger apparatus now present in the prior art, the present invention provides a lawn edger apparatus wherein the same is arranged to secure and mount a lawn edger tool relative to an edge portion of a lawn for trimming of the lawn. As such, the general purpose of the present invention, which will be described subsequently in greater detail, is to provide a new and improved lawn edger apparatus which has all the advantages of the prior art lawn edger apparatus and none of the disadvantages.

To attain this, the present invention provides a lawn edger arranged for mounting a lawn edging tool thereon, wherein the apparatus includes a support plate rotatably mounted by underlying aligned wheel members. A clamp mounted to a top surface of the support plate is positioned rearwardly of a medial forward edge of the support plate, with the medial forward edge having a downwardly projecting abutment guide plate mounted orthogonally and downwardly therefrom.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn edger apparatus which has all the advantages of the prior art lawn edger apparatus and none of the disadvantages.

It is another object of the present invention to provide a new and improved lawn edger apparatus which may be easily and efficiently manufactured and marketed.

It is a further object of the present invention to provide a new and improved lawn edger apparatus which is of a durable and reliable construction.

An even further object of the present invention is to provide a new and improved lawn edger apparatus which is susceptible of a low cost of manufacture with regard to both materials and labor, and which accordingly is then susceptible of low prices of sale to the consuming public, thereby making such lawn edger apparatus economically available to the buying public.

Still yet another object of the present invention is to provide a new and improved lawn edger apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
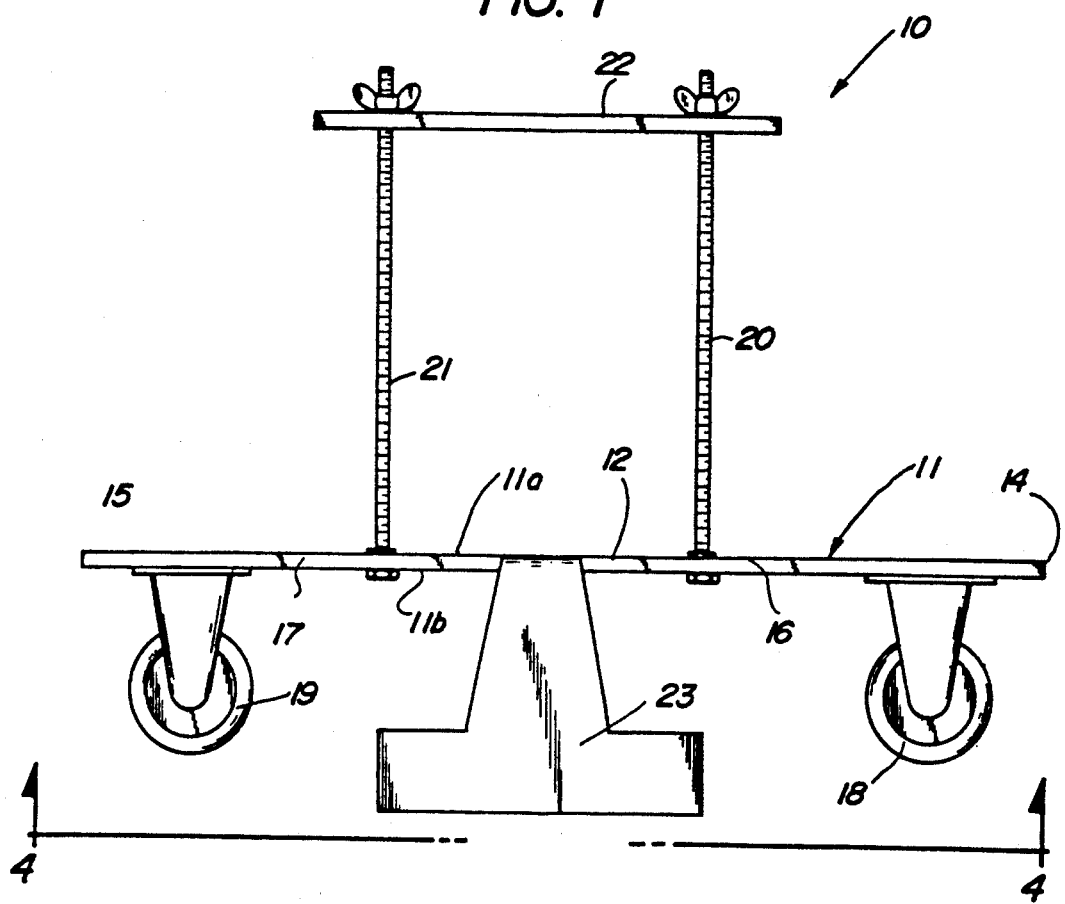
FIG. 1 is an orthographic view of the instant invention.
Figure 2:
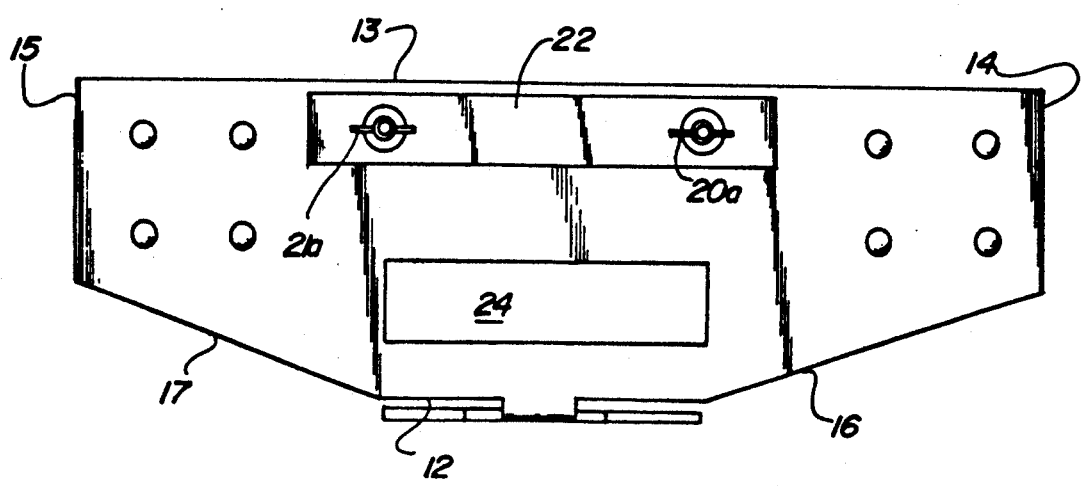
FIG. 2 is an orthographic top view of the invention.

With reference now to the drawings, and in particular to FIGS. 1 to 8 thereof, a new and improved lawn edger apparatus embodying the principles and concepts of the present invention and generally designated by the reference numerals 10 and 10a will be described.

Figure 3:
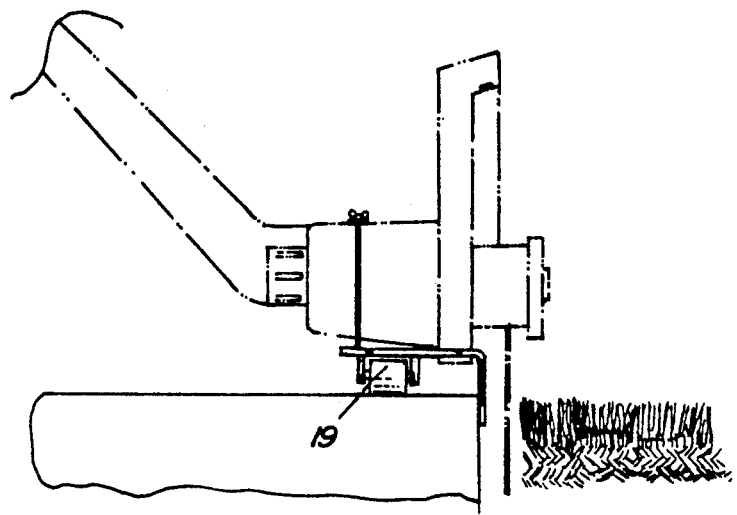
FIG. 3 is an orthographic side view of the invention in combination with a lawn edger tool structure.
Figure 4:
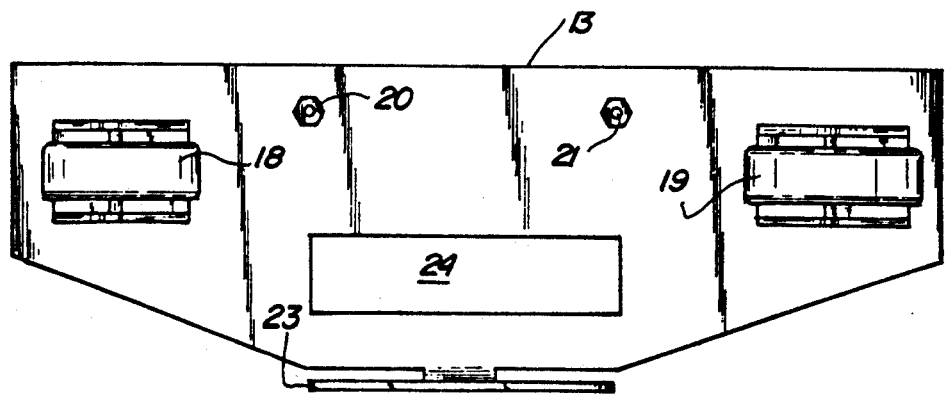
FIG. 4 is an orthographic bottom view of the invention.

More specifically, the lawn edger apparatus 10 of the instant invention essentially comprises a mounting plate 11 of planar construction having a top surface 11a parallel and coextensive with a bottom surface 11b. The mounting plate 11 includes a medial forward edge 12 positioned medially of forward edge first and second relief edges 16 and 17 canted rearwardly of the forward edge defining obtuse angles between each respective first and second relief edge 16 and 17 and the medial forward edge 12 to provide limited obstruction in positioning of a lawn edge tool relative to an edge portion of a lawn to be trimmed, such as illustrated in FIG. 3.

The forward edge 12 is spaced forwardly of and parallel a rear edge 13, with respective first and second side edges 14 and 15 extending from the rear edge 13 forwardly to the respective first and second relief edges 16 and 17. First and second wheel members 18 and 19 are arranged in a colinear relationship such that their axles are parallel relative to one another (see FIG. 4) and mounted to the bottom surface 11b. Respective first and second threaded rod members 20 and 21 are arranged in a parallel and coextensive relationship relative to one another and orthogonally to the top surface 11a adjacent the rear edge 13, wherein the first and second rods are substantially aligned at intersections of the first and second relief edges 16 and 17 with the medial edge 12. A clamp plate 22 is slidably mounted in an orthogonal relationship relative to the rod clamps 20 and 21, with rod clamp fasteners 20a and 21a threadedly mounted to the respective first and second rods to permit the clamp plate 22 to be directed downwardly relative to the top surface 11a to secure a trimming tool, such as illustrated in FIG. 3. A slot 24 is arranged to receive a housing portion of the tool to align and secure the tool relative to the medial forward edge 12. A guide plate 23 of an inverted T-shaped configuration extends downwardly relative to the medial forward edge for abutment with a border portion of a lawn, such as illustrated in FIG. 3.

Figure 5:
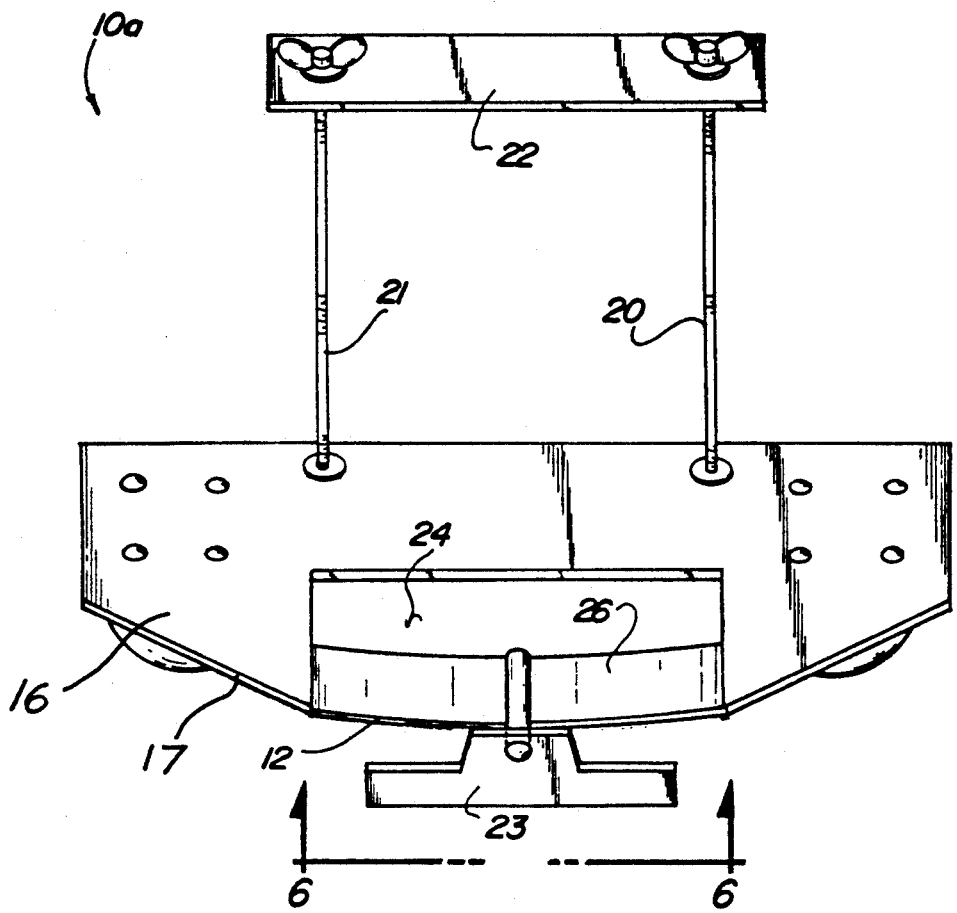
FIG. 5 is an isometric illustration of a modified aspect of the invention.
Figure 6:
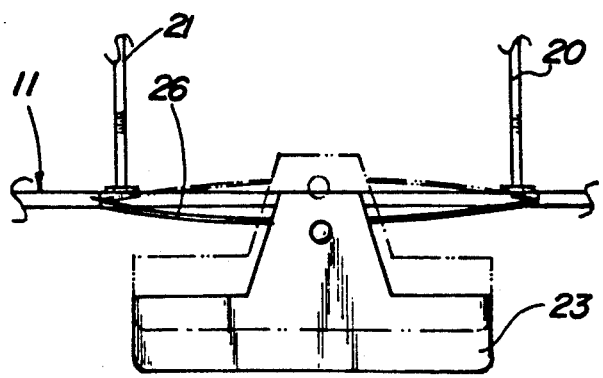
FIG. 6 is an orthographic front view of the invention, as set forth in FIG. 5, taken along the lines 6—6 in the direction indicated by the arrows.

The apparatus 10a, as illustrated in the FIGS. 5 and 6 for example, includes the medial forward edge 12 formed as the forward edge of a spring plate 26. In this manner, the spring plate 26 extends between the first and second relief edges 16 and 17 forwardly of the slot 24 in a parallel relationship relative to the slot 24 to accommodate various obstructions and imperfections in a cement type border to permit the tool to be directed along such a border without unnecessarily deflecting the tool transversely of the border and the lawn.

Figure 7:
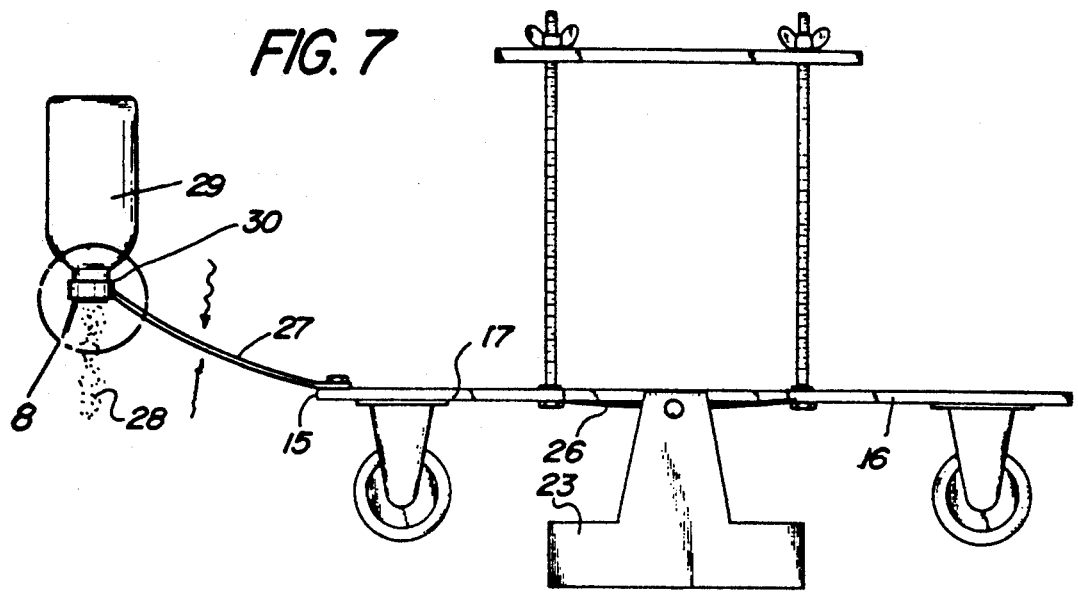
FIG. 7 is an orthographic view of the invention including a herbicide dispensing structure.
Figure 8:
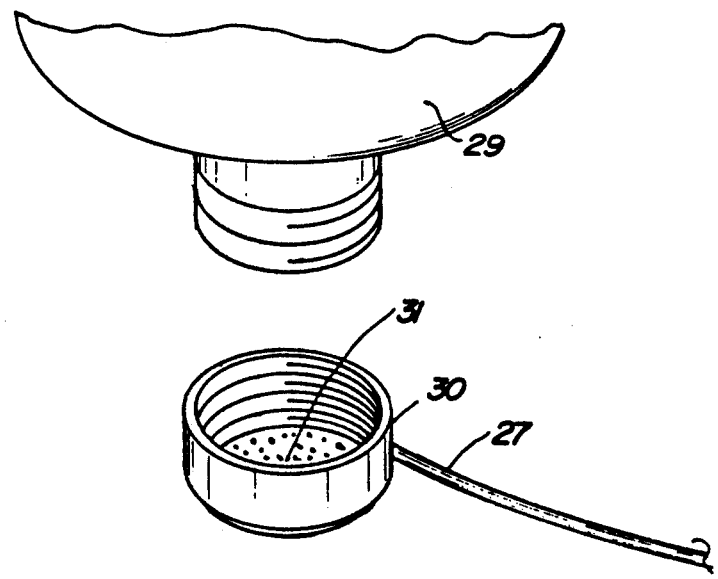
FIG. 8 is an isometric illustration of section 8 as set forth in FIG. 7.

The tool structure, as illustrated in FIGS. 7 and 8, further includes a spring rod 27 mounting a container lid 30 in a spaced relationship relative to the second side edge 15, with the lid 30 having a matrix of lid apertures 31 directed therethrough. An inverted container 29 is selectively mounted to the lid 30, with the apertures 31 aligned with the opening of the container to direct a herbicide 28 onto the lawn to further limit growth adjacent a border portion of the lawn structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn edger apparatus arranged for mounting a lawn trimming tool thereon, wherein the apparatus comprises, a mounting plate, the mounting plate including a top surface spaced from and parallel a bottom surface in a coextensive relationship, and the mounting plate including a first side edge spaced from and parallel a second side edge, and a rear edge extending orthogonally between the first side edge and the second side edge, and a medial forward edge positioned medially of and forwardly of the rear edge, with the medial forward edge including a first relief edge extending from the medial forward edge to the first side edge defining an obtuse angle between the first side edge and the medial forward edge, and the medial forward edge including a second relief edge extending from the medial forward edge to the second side edge defining an obtuse included angle between the medial forward edge and the second side edge, and clamp means orthogonally secured to the top surface between the medial forward edge and the rear edge to secure the tool to the top surface, and the clamp means includes a first rod member orthogonally mounted to the top surface, and a second rod member spaced from and parallel the first rod member in a coextensive relationship and orthogonally mounted to the top surface, and the first rod member and the second rod member including a clamp plate slidably directed along the first rod member and the second rod member, with a first fastener secured to the first rod member above the clamp plate, and the second rod member including a second fastener secured to the second rod member above the clamp plate to secure the tool between the clamp plate and the top surface, and a slot positioned parallel to the medial forward edge and coextensive with the medial forward edge and positioned between the medial forward edge and the rear edge, and the first and second rod members are positioned rearwardly of and adjacent the slot between the slot and the rear edge, and a first wheel orthogonally and rotatably mounted to the bottom surface adjacent the first side edge, and a second wheel orthogonally and rotatably mounted to the bottom surface adjacent the second side edge, with the first wheel and the second wheel arranged in a colinear relationship, with the first wheel including a first wheel axle, the second wheel including a second wheel axle, with the first wheel axle and the second wheel axle oriented in a first wheel axle and the second wheel axle oriented in a parallel relationship to one another, and an inverted T-shaped guide plate extending orthogonally and downwardly relative to the medial forward edge and the mounting plate, and the medial forward edge includes a spring plate extending between the first relief edge and the second relief edge forwardly of the slot.

2. An apparatus as set forth in claim 1 including a spring rod, the spring rod extending laterally of the second side edge and including a container lid fixedly mounted to the spring rod spaced from the second side edge, and the container lid including a matrix of lid apertures directed therethrough, and an inverted container secured within the lid, with the container including a container opening in confrontation with the lid apertures.

* * * * *